(12) United States Patent  
Kopecek

(10) Patent No.: US 9,356,486 B2  
(45) Date of Patent: May 31, 2016

(54) POSITION SENSING TECHNIQUES

(71) Applicant: Woodward HRT, Inc., Santa Clarita, CA (US)

(72) Inventor: Joseph Thomas Kopecek, Santa Clarita, CA (US)

(73) Assignee: Woodward HRT, Inc., Santa Clarita, CA (US)

(*) Notice: Subject to any disclaimer, the term of this patent is extended or adjusted under 35 U.S.C. 154(b) by 320 days.

(21) Appl. No.: 14/015,008

(22) Filed: Aug. 30, 2013

(65) Prior Publication Data

US 2015/0061471 A1 Mar. 5, 2015

(51) Int. Cl.

| | |
|---|---|
| *G01B 7/14* | (2006.01) |
| *H02K 7/06* | (2006.01) |
| *G01D 5/14* | (2006.01) |
| *G01B 7/00* | (2006.01) |

(52) U.S. Cl.  
CPC ............... *H02K 7/06* (2013.01); *G01D 5/145* (2013.01); *G01B 7/003* (2013.01)

(58) Field of Classification Search  
CPC .......... G01D 5/145; G01P 3/487; G01B 7/003  
USPC .................... 324/207.24, 207.13, 207.15  
See application file for complete search history.

(56) References Cited

U.S. PATENT DOCUMENTS

| | | | |
|---|---|---|---|
| 6,911,819 B1* | 6/2005 | Tabrizi ................. | 324/207.18 |
| 7,218,099 B2* | 5/2007 | Yamamoto et al. ..... | 324/207.25 |
| 7,956,606 B2* | 6/2011 | Burt et al. ............ | 324/207.25 |
| 2006/0022667 A1* | 2/2006 | Nyce ................... | 324/207.24 |

* cited by examiner

*Primary Examiner* — Reena Aurora  
(74) *Attorney, Agent, or Firm* — BainwoodHuang

(57) ABSTRACT

An apparatus includes a housing which defines a longitudinal axis; a positioning element which, relative to the housing, translates linearly along the longitudinal axis; and a rotational member which, relative to the housing, rotates about the longitudinal axis as the positioning element translates linearly along the longitudinal axis. The rotational member defines a helix to receive torque from the positioning element as the positioning element translates linearly along the longitudinal axis. The apparatus further includes a first sensor assembly to detect minor angular displacement of the rotational member (e.g., less than 360 degrees). The apparatus further includes a second sensor assembly to detect major angular displacement of the rotational member (e.g., a number of full 360 degree rotations). Such detection is capable of identifying a full angular displacement of the rotational member in response to linear translation of the positioning element from an initial position to a sensed position.

18 Claims, 14 Drawing Sheets

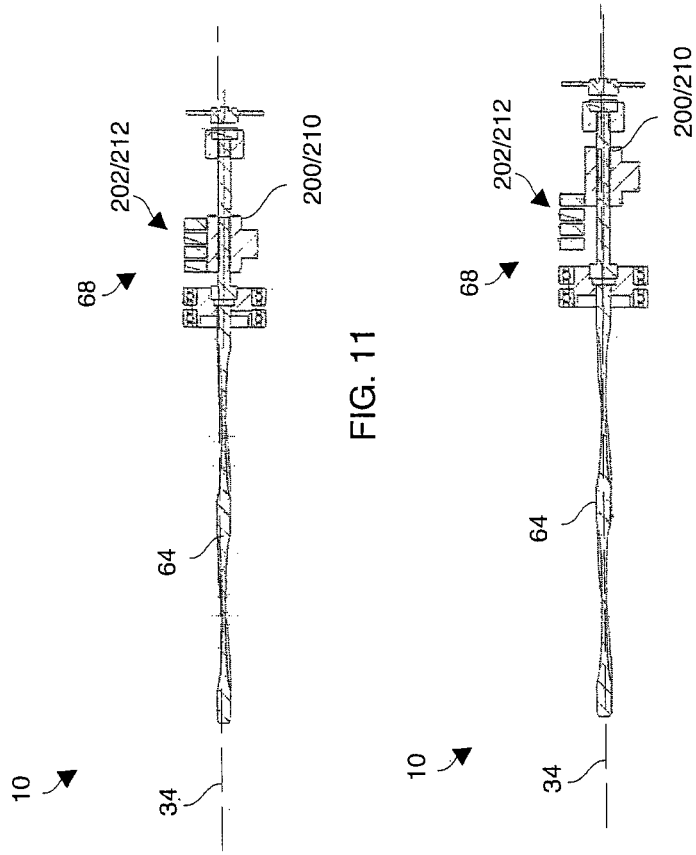

POSITION SENSING TECHNIQUES

BACKGROUND

Some conventional actuators include an elongated housing, an elongated positioning element, and a motor. The elongated housing attaches to a fixed body, and the elongated positioning element attaches to an object. The motor moves the elongated positioning element along a central axis defined by the elongated housing to move the object relative to the fixed body.

To sense position, these actuators may further include a helix-shaped rotational member and a bearing element. The helix-shaped rotational member is disposed along the central axis defined by the elongated housing. Additionally, the bearing element provides support for the elongated positioning element, and enables the elongated positioning element to travel laterally along the helix-shaped rotational member and rotate the helix-shaped rotational member about the central axis in the process. As the helix-shaped rotational member rotates in response to lateral movement of the elongated positioning member, magnets mounted to the helix-shaped rotational member move past Hall sensors which detect rotation of the helix-shaped rotational member. As a result, linear movement of the elongated positioning element can be measured based on rotation of the helix-shaped rotational member.

SUMMARY

The above-described conventional actuators do not require memory to store current position information provided that the helix-shaped rotational member does not rotate more than 360 degrees. Rather, as long as the helix-shaped rotational member does not rotate more than 360 degrees, the current angular displacement of the helix-shaped rotational member correlates with the current linear displacement of the elongated positioning element. Accordingly, such actuators are capable of providing accurate position sensing even after power interruption.

Additionally, the above-described conventional actuators are capable of providing high position sensing resolution. That is, the geometries of the helix-shaped rotational member such as the rate of turn of the helix can be tailored to accurately convert sensed angular displacement of the helix-shaped rotational member with lateral movement of the elongated positioning element along the central axis. Additionally, as the length of the actuator decreases, the position sensing resolution proportionately increases.

Furthermore, the above-described conventional actuators are well-suited for certain situations such as short stroke applications. An example of such an application is the control of an aircraft flight control surface.

Similar position sensing assemblies and actuators are disclosed in U.S. Pat. No. 7,956,606. The teachings of U.S. Pat. No. 7,956,606 are hereby incorporated by reference in their entirety.

Improved techniques are directed to position sensing and actuator techniques which involve use of a helix-shaped rotational member and sensor assemblies which accurately detect rotation of the helix-shaped rotational member beyond 360 degrees. Such techniques are well suited for applications requiring relatively large linear displacement (e.g., long stroke actuators). Moreover, such techniques still do not require memory to store current position information thus enabling accurate position sensing even after power interruption, and can alleviate the need to sacrifice actuator length for higher resolution.

One embodiment is directed to a position sensing apparatus which includes a housing which defines a longitudinal axis; a positioning element which, relative to the housing, translates linearly along the longitudinal axis; and a rotational member which, relative to the housing, rotates about the longitudinal axis as the positioning element translates linearly along the longitudinal axis. The rotational member defines a helix to receive torque from the positioning element as the positioning element translates linearly along the longitudinal axis. The position sensing apparatus further includes a first sensor assembly having (i) a set of magnets coupled to the rotational member and (ii) a first set of sensors coupled to the housing, the first set of sensors being constructed and arranged to detect angular displacement of the set of magnets about the longitudinal axis. The position sensing apparatus further includes a second sensor assembly having (i) a linear displacement member, which relative to the housing, translates linearly along the longitudinal axis and (ii) a second set of sensors coupled to the housing, the second set of sensors being constructed and arranged to detect linear displacement of the linear displacement member along the longitudinal axis.

In some arrangements, the rotational member is capable of rotating more than 360 degrees about the longitudinal axis in response to linear translation of the positioning element from an initial position along the longitudinal axis to a sensed position along the longitudinal axis. In these arrangements, the initial position and the sensed position reside within a linear range of motion for the linear displacement member along the longitudinal axis. Additionally, the second set of sensors (e.g., a set of proximity sensors) is constructed and arranged to provide a signal indicating a number of full 360 degree rotations of the rotational member in response to linear translation of the positioning element from the initial position to the sensed position. Furthermore, the first set of sensors (e.g., a set of Hall sensors) is constructed and arranged to provide a signal indicating a partial rotation of the rotational member which is less than 360 degrees in response to linear translation of the positioning element from the initial position to the sensed position. The number of full 360 degree rotations and the partial rotation of the rotational member which is less than 360 degrees identifies a full angular displacement of the rotational member in response to linear translation of the positioning element from the initial position to the sensed position.

In some arrangements, the linear displacement member defines an outer surface which, based on depth sensing, is detected by the second set of sensors to identify a current position of the linear displacement member along the longitudinal axis. For example, the linear displacement member can have a constant outer diameter, and the second set of sensors includes multiple proximity sensing devices, each of the multiple proximity sensing devices being constructed and arranged to detect presence of the output surface of the linear displacement member at the same depth.

In some arrangements, the second set of sensors outputs a multi-bit signal in which a number of asserted bits of the multi-bit signal indicates a number of full revolutions performed by the rotational member in response linear translation of the positioning element from the initial position to the sensed position. In other arrangements, the second set of sensors outputs a multi-bit signal in which a particular order of a highest order asserted bit of the multi-bit signal indicates a number of full revolutions performed by the rotational member in response linear translation of the positioning element from the initial position to the sensed position. In yet other arrangements, the second set of sensors outputs a multi-bit signal in which a particular bit location of an asserted bit of the multi-bit signal indicates a number of full revolutions performed by the rotational member in response linear translation of the positioning element from the initial position to the sensed position.

In some arrangements, the linear displacement member has a stepped outer diameter. In these arrangements, the second set of sensors includes multiple proximity sensing devices, each of the multiple proximity sensing devices being constructed and arranged to detect presence of the output surface of the linear displacement member at the different depth. For example, the second set of sensors can output a multi-bit signal in which a particular bit pattern of the multi-bit signal indicates a number of full revolutions performed by the rotational member in response linear translation of the positioning element from the initial position to the sensed position.

In some arrangements, the linear displacement member physically contacts the rotational member at a sliding interface to enable the linear displacement member to translate linearly relative to the rotational member. For example, the linear displacement member can take the form of an axially moving nut having fine threads which engage the housing or an outer nut attached to the housing. Here, the rotational member has a drive key which interfaces with a key slot defined by the axially moving nut. Accordingly, as the rotational member rotates, the axially moving nut moves along the central axis by threading further into or out of the housing.

In some arrangements, the linear displacement member is physically coupled to the positioning element to enable the linear displacement member to translate linearly with linear translation of the positioning element. Here, the number of moving parts is minimized, but the number of rotations of the rotational member can still be determined by sensing of the surface of the linear displacement member.

In some arrangements, the position sensing apparatus further includes summation circuitry coupled to the first set of sensors and the second set of sensors. The summation circuitry has a first input, a second input and a terminal. The first input receives, as a first input signal, the signal indicating a partial rotation of the rotational member which is less than 360 degrees from the first set of sensors in response to linear translation of the positioning element from the initial position to the sensed position. The second input receives, as a second input signal, the signal indicating the number of full 360 degree rotations of the rotational member from the second set of sensors in response to linear translation of the positioning element from the initial position to the sensed position. The terminal provides a summation signal based on the first input signal and the second input signal, the summation signal indicating the total angular displacement of the rotational member in response to linear translation of the positioning element from the initial position to the sensed position.

In some arrangements, the position sensing apparatus further includes positioning circuitry coupled to the summation circuitry. The positioning circuitry has an input which receives the summation signal from the summation circuitry, and an output which provides a current position signal indicating a current position of the positioning element relative to the housing.

In some arrangements, the positioning element is constructed and arranged to connect to an external object (e.g., an aircraft's control surface such as an aileron, elevator, rudder, etc.). In these arrangements, the position sensing apparatus may further include an electric motor coupled to the housing, the electric motor being constructed and arranged to move the positioning element linearly along the longitudinal axis based on, as feedback, the current position signal to control positioning of the external object relative to the housing.

Other embodiments are directed to electronic systems and apparatus, processing circuits, computer program products, and so on. Some embodiments are directed to various actuation methods, actuators, electronic components and circuitry which are involved in position sensing and/or actuation.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 11 illustrates certain details of an axially aligned position sensing arrangement in an initial state.

FIG. 12 illustrates certain details of the axially aligned position sensing arrangement in a different state.

DETAILED DESCRIPTION

Overview

An improved technique is directed to a position sensing assembly and an actuator which involve use of a helix-shaped rotational member and sensor assemblies to accurately detect rotation of the helix-shaped rotational member more than 360 degrees. Such a technique is well suited for position sensing applications requiring relatively large linear displacement (e.g., long stroke actuators). Additionally, such a technique does not require memory to store current position information thus enabling accurate position sensing even after power interruption. Furthermore, such a technique can alleviate the need to sacrifice actuator length for higher resolution.

Figure 1:
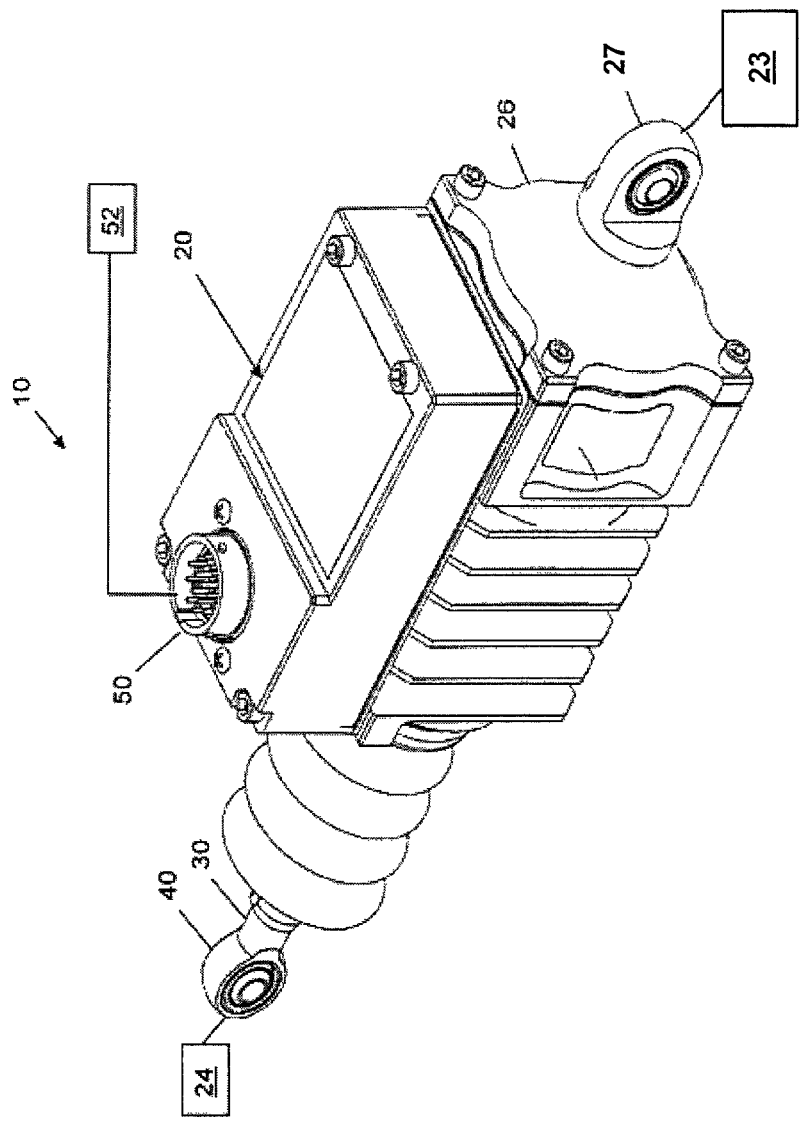
FIG. 1 illustrates a perspective view of an actuator having a position sensing assembly.
Figure 2:
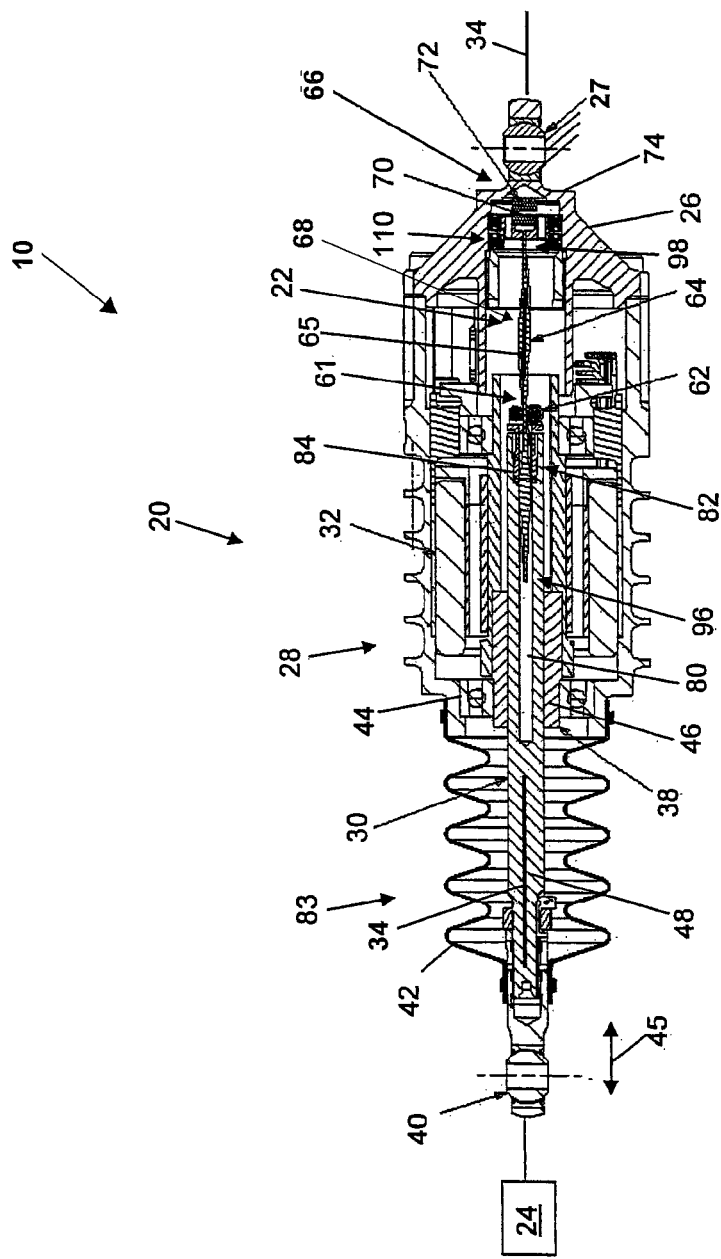
FIG. 2 illustrates a sectional view of the actuator of FIG. 1.

FIGS. 1 and 2 show an apparatus 10 having an actuator assembly 20 and a position sensing apparatus 22. The apparatus 10 further includes a housing 26 configured to be secured to a base (or rigid surface) 23 (FIG. 1). In one arrangement, the housing 26 includes an attachment portion 27, such as an eyelet, which is configured to receive a fastener to secure the housing 26 to the base 23. The actuator assembly 20 includes an actuator 28 (FIG. 2) carried by the housing 26 and configured to control the positioning of an external control element 24. While the actuator 28 can be configured in a variety of ways, in one arrangement, the actuator 28 includes a positioning element 30 and a motor 32.

The positioning element 30 is configured to be attached to the external control element 24. For example, the positioning element 30 includes an attachment portion 40, such as an eyelet which is configured to receive a fastener to secure the positioning element 30 to the external control element 24. With such attachment, linear movement 45 of the positioning element 30 causes the external control element 24 (e.g., an aircraft's control surface) to change its position and/or orientation relative to the base 23 (e.g., an aircraft frame). Additionally, interaction between the attachment portion 40 and the external control element 24 also constrains rotation of the positioning element 30 about a longitudinal axis 34 during operation.

In one arrangement, the apparatus 10 further includes a protective sheath 42 disposed around the positioning element 30. The protective sheath 42, such as a bellows, extends between the attachment portion 40 and the housing 26. The protective sheath 42 is configured to allow linear motion of the positioning element 30 relative to the longitudinal axis 34 defined by the housing 26 while minimizing the ability for dust or other contaminants to enter the housing 26 and damage internal components.

The motor 32, such as a servo motor, is configured to control linear motion of the positioning element 30 relative to the longitudinal axis 34. For example, in one arrangement, the motor 32 includes a ball nut 38 supported at least partially by a rotary bearing 44 disposed within the housing 26. The ball nut 38 defines a set of threads 46 that mesh with corresponding threads 48 disposed on the positioning element 30. During operation, in response receiving a command signal, the motor 32 rotates the ball nut 38 relative to the positioning element 30. Based upon the interaction between the threads 46 of the ball nut 38 and the threads 48 of the positioning element 30 and because the external control element 24 rotationally constrains the positioning element 30, such rotation causes the positioning element 30 to linearly translate (arrow 45) along the longitudinal axis 34 and relative to the housing 26. Such linear translation 45 of the positioning element 30 causes the external control element 24 to change its position relative to the base 23.

Position Sensing Details

Figure 9:
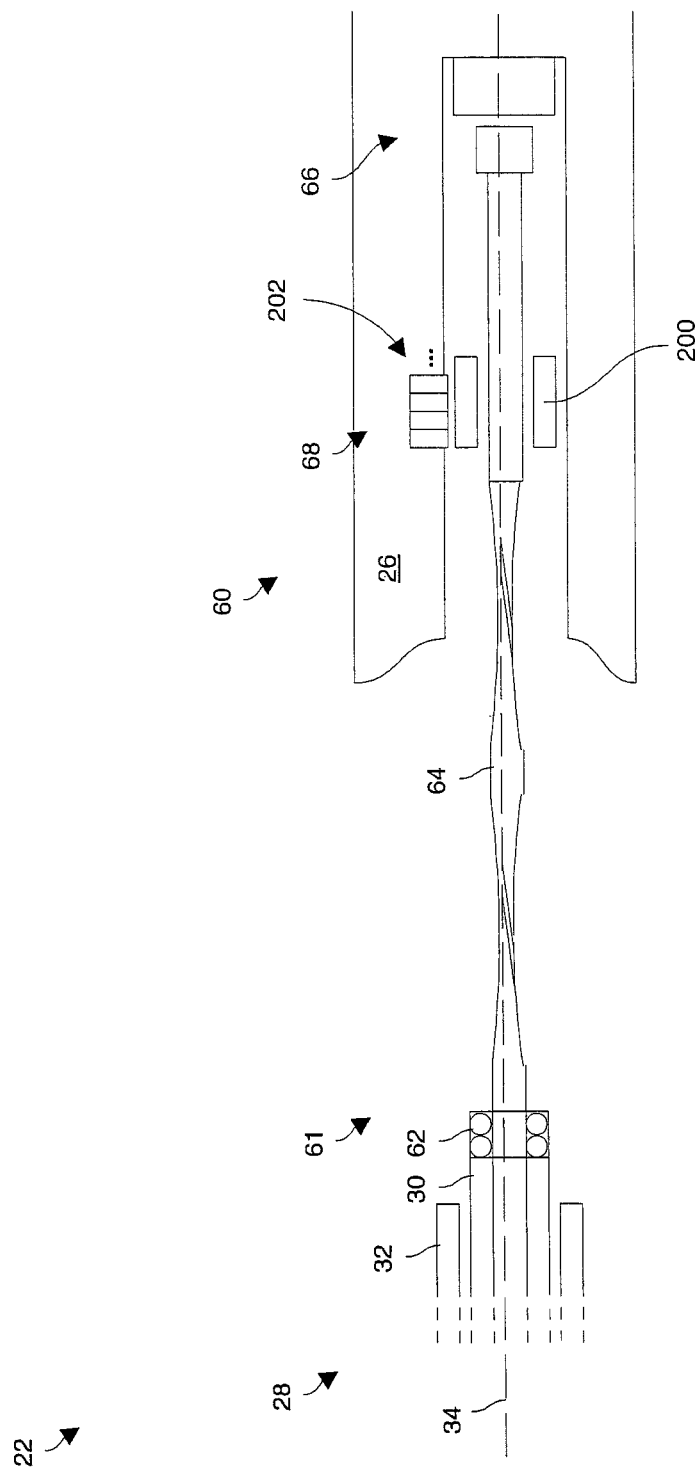
FIG. 9 illustrates a general placement of various components of the position sensing assembly.

FIGS. 2 and 9 show general details of the position sensing apparatus 22. The position sensing apparatus 22 is configured to detect displacement of the positioning element 30 of the actuator 28 relative to the housing 26 (also see FIG. 2). In particular, in response to operation of the motor 32, the positioning element 30 moves within a predefined linear range of motion along the longitudinal axis 34 from an initial position (e.g., a starting or zero position) to a sensed position.

Figure 3:
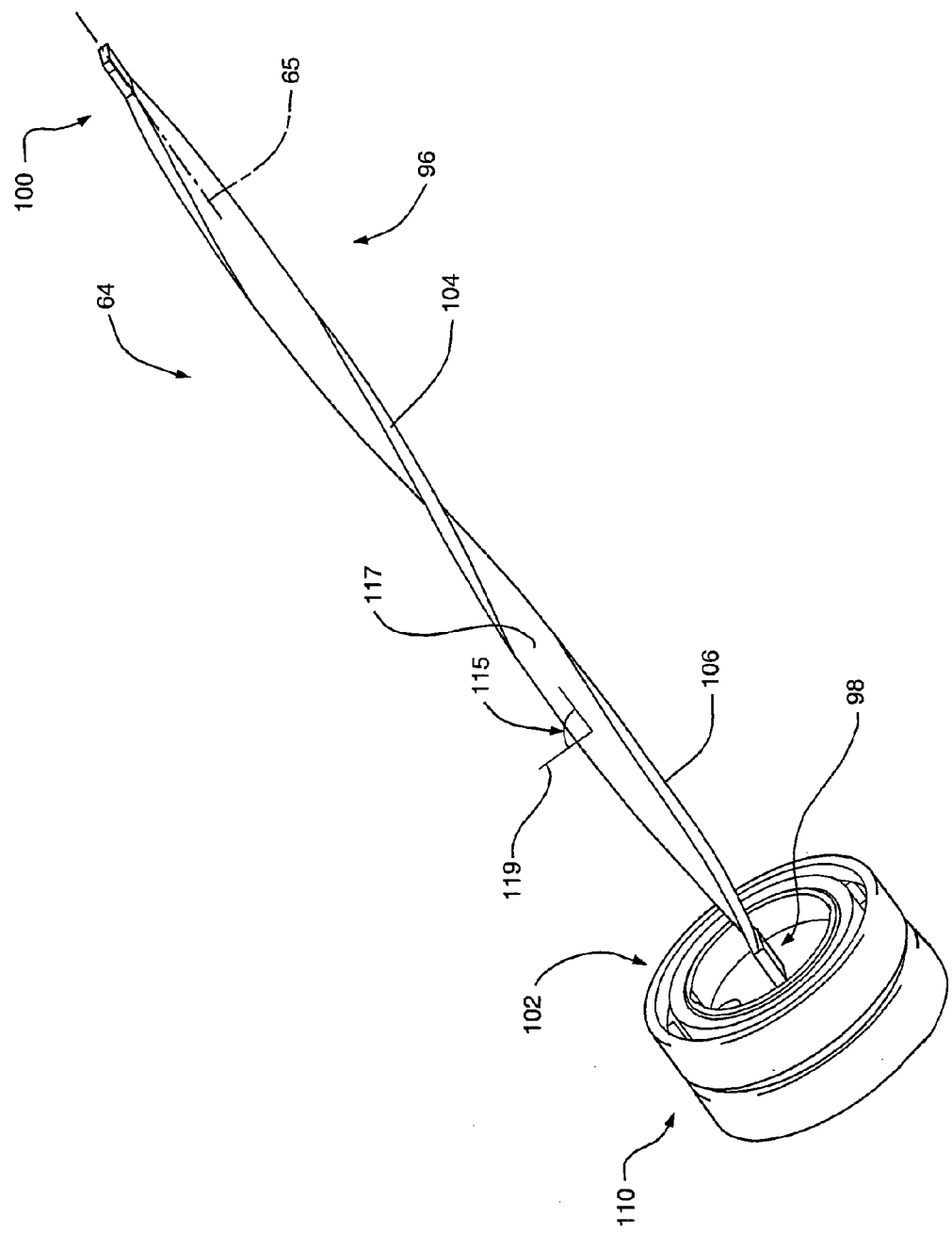
FIG. 3 illustrates a perspective view of a rotational member of the position sensing assembly.
Figure 4:
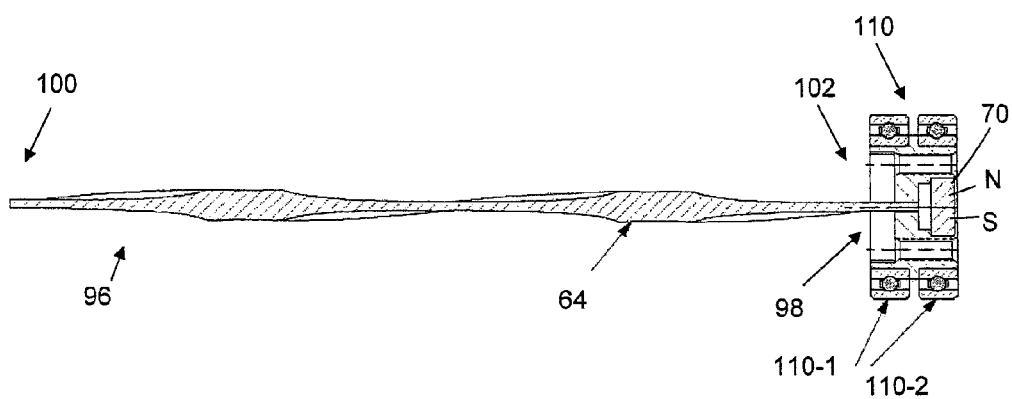
FIG. 4 illustrates a sectional view of the rotational member of FIG. 3.
Figure 5:
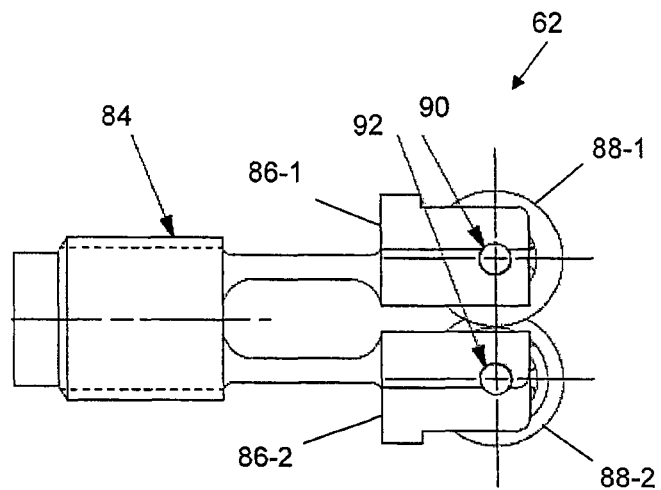
FIG. 5 illustrates a side view of a bearing element of the position sensing assembly.
Figure 6:
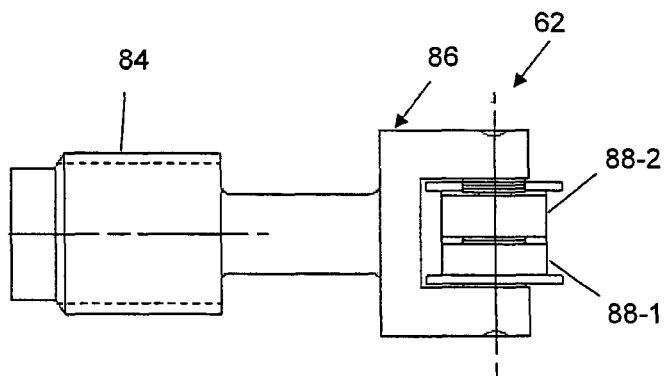
FIG. 6 illustrates a top view of the bearing element of FIG. 5.
Figure 7:
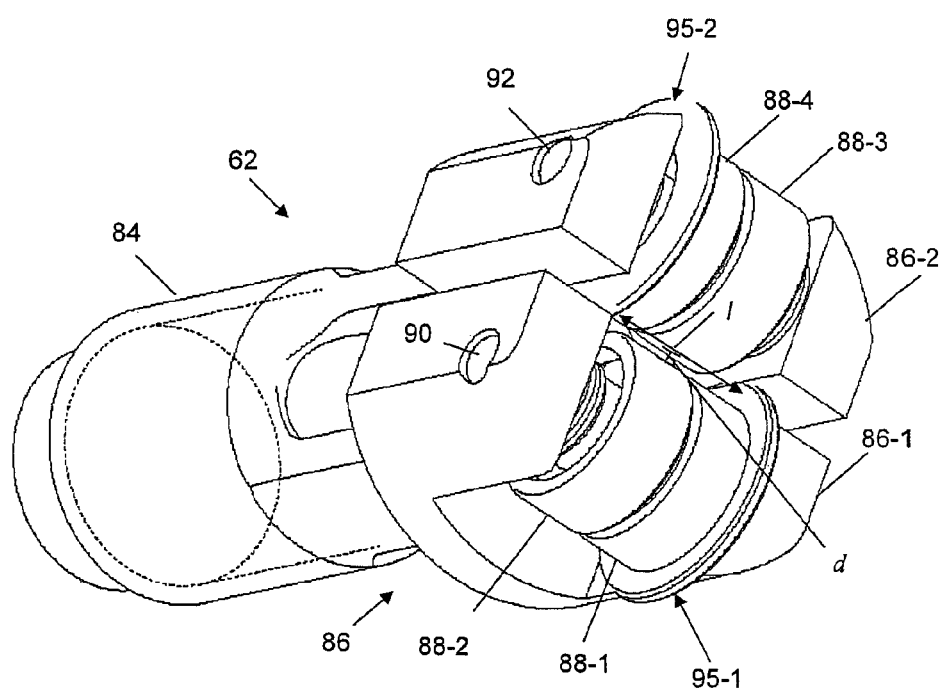
FIG. 7 illustrates a front perspective view of the bearing element of FIG. 5.

The position sensing apparatus 22 includes sensing subsystem 60 and a rotation assembly 61. The rotation assembly 61 has a bearing element 62 carried by the positioning element 30 and a rotational member 64. During operation, as the positioning element 30 translates linearly along the longitudinal axis 34 (FIG. 2), the positioning element 30 applies torque to the rotational member 64 to rotate the rotational member 64 about the longitudinal axis 34. FIGS. 5 through 8 show various views of the bearing element 62 which engages the rotational member 64. FIGS. 3 and 4 show various views of the rotational member 64 on which the bearing element 62 rides and to which the bearing element 62 provides rotation as the positioning element 30 translates linearly along the longitudinal axis 34.

As shown in FIG. 9, the sensing subsystem 60 includes a partial rotation sensing assembly 66 and full rotation sensing assembly 68. The partial rotation sensing assembly 66 is configured to identify angular displacement of the rotational member 64 inside 360 degrees (i.e., angular displacement between 0 and 360 degrees) due to movement of the positioning element 30 from the initial position to the sensed position along the longitudinal axis 34. The full rotation sensing assembly 68 is configured to sense linear displacement of a linear displacement member 200 (e.g., an outer surface of a nut which is guided by the rotational member 64, a portion of the positioning element 30, etc.) along the longitudinal axis 34 to identify the number of full rotations (i.e., complete 360 degree revolutions) by the rotational member 64 due to movement of the positioning element 30 from the initial position to the sensed position along the longitudinal axis 34.

In some arrangements, the partial rotation sensing assembly 66 and the full rotation sensing assembly 68 provide separate signals via a port 50 to an actuator controller 52 (FIG. 1). Accordingly, the actuator controller 52 can process these separate signals to accurately determine the full angular displacement of the rotational member 64 (i.e., a total of the partial angular displacement and the number of full rotations) and thus identify the precise linear displacement of the positioning element 30 relative to the housing 26.

In other arrangements, the sensing subsystem 60 of the position sensing apparatus 22 includes additional logic which generates a summation signal which is provided via the port 50 to the actuator controller 52 (FIG. 1). The summation signal is indicative of the total angular displacement of the rotational member 64 resulting from travel of the positioning element 30 from the initial position to the sensed position along the longitudinal axis 34 thus alleviating the need for the actuator controller 52 to perform this operation.

Partial Rotation Sensing (<360 Degrees)

Figure 15:
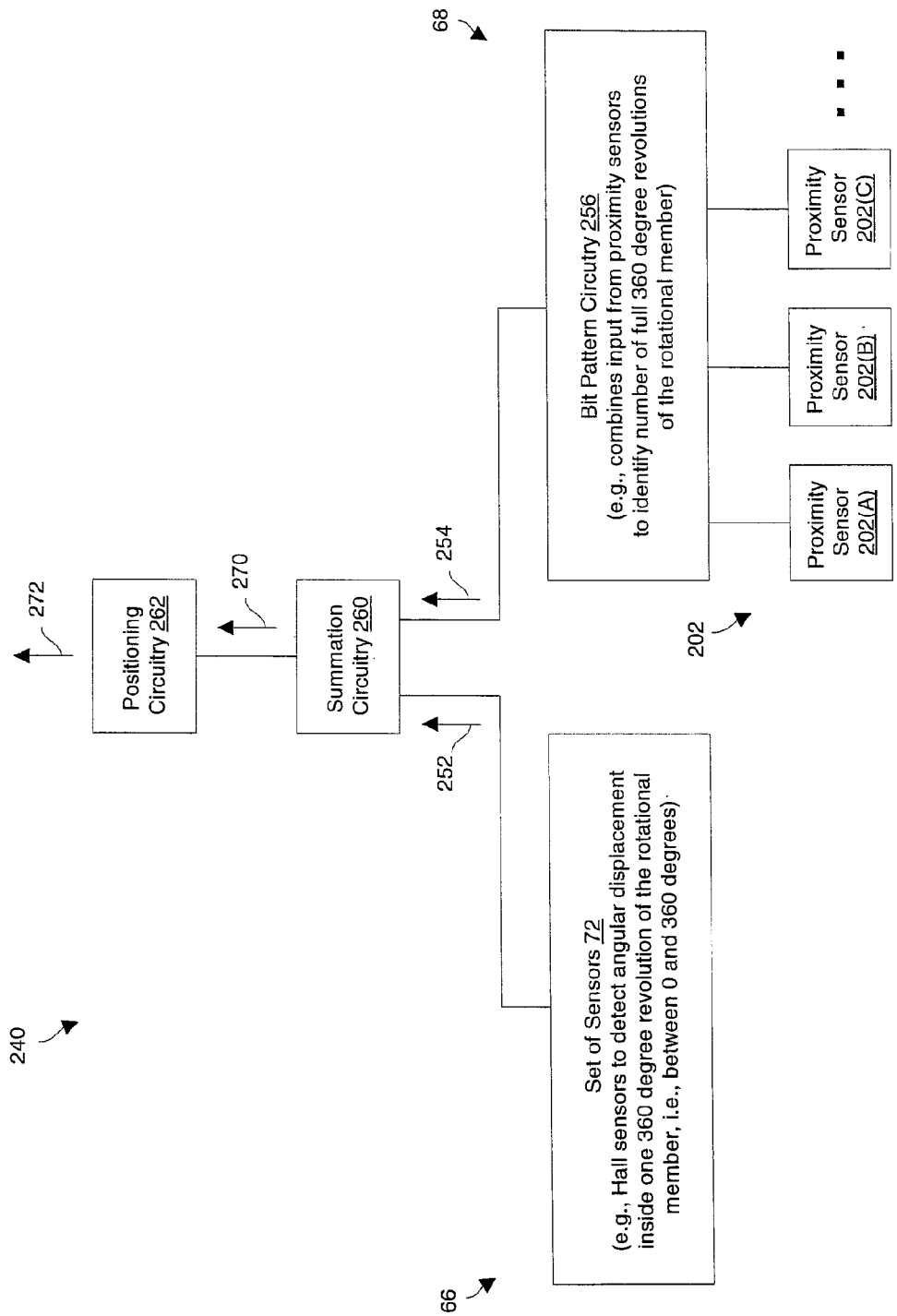
FIG. 15 illustrates certain details of a position identification circuit of the position sensing assembly.

As mentioned above, the partial rotation sensing assembly 66 identifies partial angular displacement of the rotational member 64 inside of 360 degrees when the positioning element 30 moves from an initial position to a sensed position. As shown in FIGS. 2 and 4, the partial rotation sensing assembly 66 includes a set of magnets 70 (i.e., one or more magnets 70) attached to the rotational member 64 and a set of sensors 72 (i.e., one or more sensors 72) attached to the housing 26. In some arrangements, the partial rotation sensing assembly 66 is configured as a rotary sensor such as a Digital Rotary Magnetic Encoder. The set of magnets 70, for example, includes a bipolar magnet having a north pole N and a south pole S. The set of sensors 72 is configured to detect flux or variations in the magnetic field of the set of magnets 70 as the set of magnets 70 rotates relative to the set of sensors 72. For example, in one arrangement, the set of sensors 72 is configured as a set of Hall sensors (or a set of magnetic field sensors). While the Hall sensors can have a variety of configurations, in one arrangement, the Hall sensors are included as part of an integrated circuit (ICs) mounted on a printed circuit board (PCB) 74. In use, the set of sensors 72, located next to the set of magnets 70, senses the rotation of the north N and south S poles and provides a corresponding output signal (1024 or 4096 counts or signals per revolution) to the port 50 and/or additional logic of the sensing assembly 60 (FIG. 15). When the output signal is provided to the port 50, the actuator controller 52 can combine the information from the partial rotation sensing assembly 66 with information from the full rotation sensing assembly 68 to determine the absolute position of the positioning element 30, i.e., the sensed position. When the output signal is provided to the additional logic of the sensing assembly 60, the additional logic uses the information with other information to internally generate an output signal which indicates the total positioning of the positioning element 30. Accordingly, if the apparatus 10 were to lose and regain power, upon resumption of power, the actuator controller 52 can determine the current position of the positioning element 30 relative to the housing 26 based upon signals from the sensing assembly 60 after the resumption of power.

As will be described in further detail below, bearing element 62 and the rotational member 64 of the rotation assembly 61 are configured to convert the linear motion of the positioning element 30 into a rotary motion of the magnet portion 70. When used in conjunction with the full rotation sensing assembly 68, the rotation assembly 61 adapts the sensing subsystem 60 to allow the sensing subsystem 60 to read linear movement of the positioning element 30 in the actuator assembly 20.

With respect to the bearing element 62, in one arrangement and with particular reference to FIG. 2, the bearing element 62 is carried by the positioning element 30. For example, the positioning element 30 defines a bore or chamber 80 that extends from a second end 82 of the positioning element 30 toward a first or connector end 83 of the positioning element 30. As indicated, a base portion 84 of the bearing element 62 is disposed within the chamber 80. Interaction, such as a friction fit, between the base portion 84 and the chamber 80 secures the bearing element 62 to the positioning element 30.

While the rotational member 64 can be carried by the actuator assembly 20 in a variety of ways, in one arrangement, the rotational member 64 includes a first portion 96 carried by the bearing element 62 and a second portion 98 rotatably coupled to the housing 26. With respect to the first portion of the rotational member 64, and as indicated above, interaction between the bearing element 62 and the rotational member 64 is configured to convert the linear motion of the positioning element 30 into a rotary motion of the set of magnets 70 to cause the sensing subsystem 60 to generate a signal identifying an angular displacement inside 360 degrees. Accordingly, description of arrangements of the rotational member 64 and the bearing element is provided below.

While bearing element 62 can have a variety of configurations, in one arrangement and with particular reference to FIGS. 5-8, the bearing element 62 is configured as a roller bearing element. For example, the bearing element 62 includes a bearing support portion 86 that carries a set of roller bearings 88. While the bearing support portion 86 can be configured with any number of roller bearings 88, in the illustrated example, the bearing support portion 86 includes four roller bearings 88. As illustrated, the bearing support portion 86 includes first and second roller bearings 88-1, 88-2 rotatably mounted via an axel 90 to a first bearing support portion 86-1 and third and fourth bearings 88-3, 88-4 rotatably mounted via an axle 92 and to a second bearing support portion 86-2. Also as shown, the roller bearings 88 define a channel 94 configured to support the rotational member 64, as described in detail below. For example, the first roller bearing includes a first flange 95-1 while the fourth roller bearing 88-4 defines a second flange 95-2 where the first and second flanges 95-1, 95-2 are spaced apart by a distance l. Additionally, the first and second roller bearings 88-1, 88-2 and the third and fourth bearings 88-3, 88-4 are offset by a distance d. In one arrangement, distance d is less than the thickness of the rotational member 64. Taken collectively, distance l between the first and second flanges 95-1, 95-2 and the offset distance d define the channel 94 for support of the rotational member 64.

In one arrangement, the bearing support members 86-1, 86-2 are formed from a spring steel material, such as 17-7PH stainless steel define a second channel 94-2. In such an arrangement, the support members 86-1, 86-2 are configured as cantilevered beams or springs that maintain a substantially constant force, such as about three pounds force, on the rotational element 64 to minimize or eliminate backlash between the support members 86-1, 86-2 and the rotational member 64.

As indicated above, the rotational member 64 includes a first portion 96 carried by the bearing element 62. In one arrangement and with reference to FIGS. 3 and 4, the first portion 96 of the rotational member 64 is configured as a helix or a spiral shape extending between a first end 100 of the rotational member 64 and a second end 102 of the rotational member 64 where the first end 100 opposes the second end 102. While the rotational member 64 can be manufactured from a variety of materials, in one arrangement the rotational member 64 is manufactured from a flat strip of spring steel, twisted about a longitudinal axis 65 of the strip into a spiral shape.

Figure 10A:
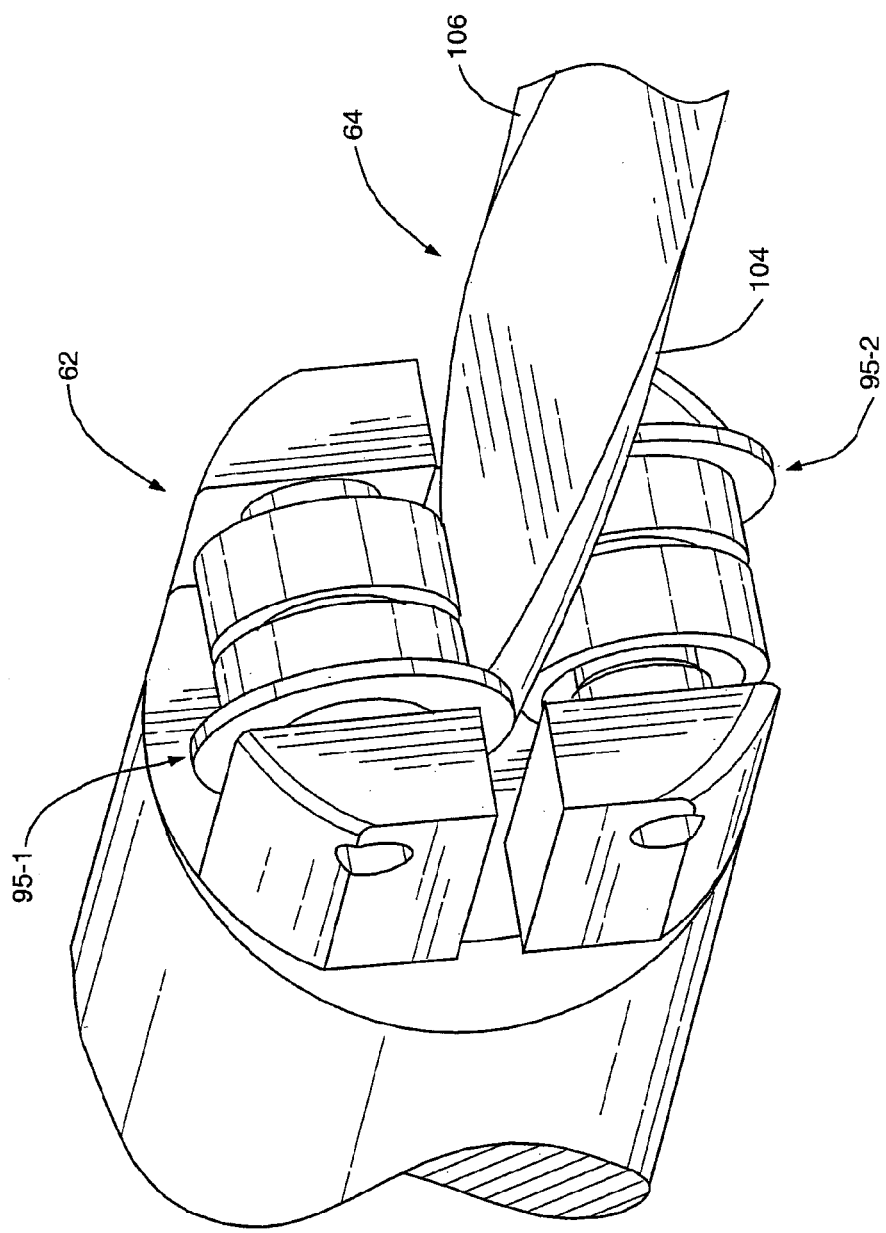
FIG. 10A illustrates a first perspective view of the rotational member carried by the bearing element of FIG. 5.
Figure 10B:
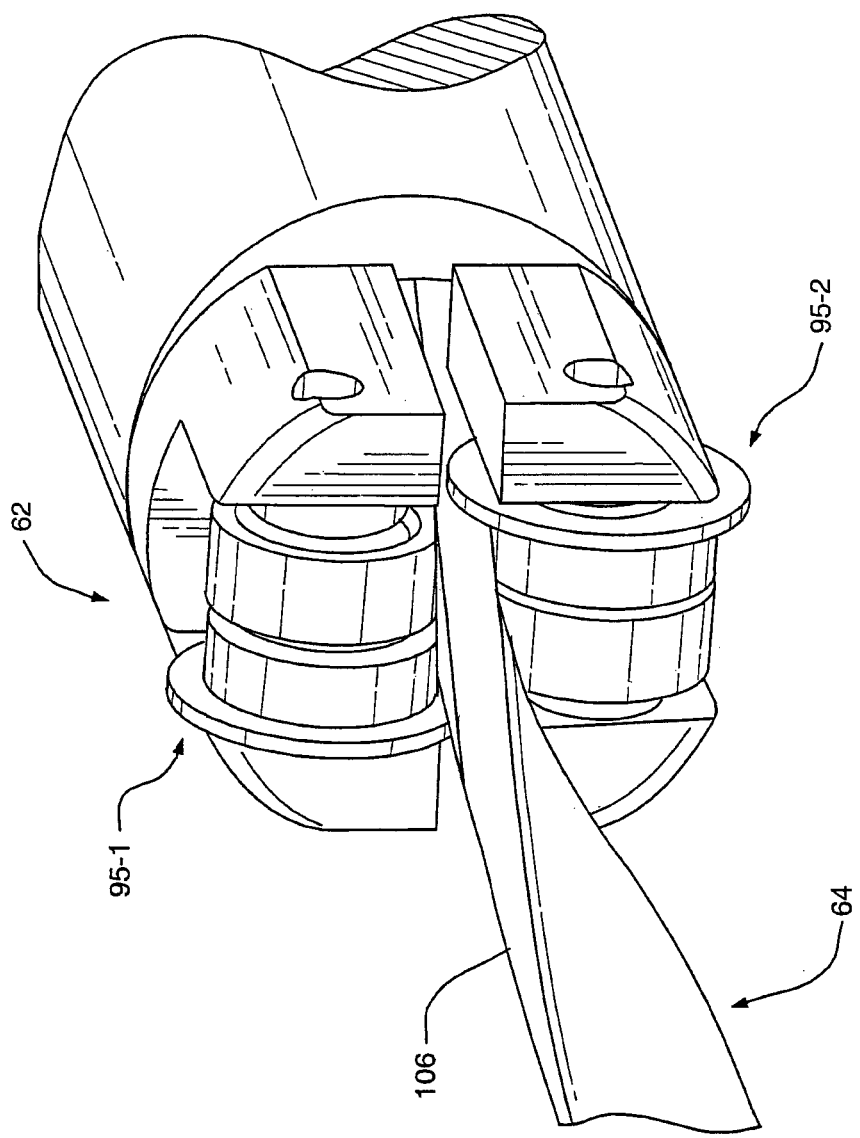
FIG. 10B illustrates a second perspective view of the rotational member carried by the bearing element of FIG. 5.

The rotational member 64 includes a first edge portion 104 extending between the first end 100 and the second end 102 of the rotational member 64 and a second edge portion 106 extending between the first end 100 and the second end 102 of the rotational member 64, the first edge portion 104 opposing the second edge portion 106. As illustrated in FIGS. 10A and 10B, the first and second edge portions 104, 106 are configured to be disposed in proximity to the first and second flanges 95-1 and 95-2 of the bearing element 62. For example, in one arrangement the first edge portion 104 of the rotational member 64 is disposed in proximity to the first flange 95-1 and the second edge portion 106 of the rotational member 64 is disposed in proximity to the second flange 95-2. Interaction between the edge portions 104, 106 of the rotational member 64 and the first and second flanges 95-1 and 95-2 of the bearing element 62 constrains lateral motion of the rotational member 64 during operation.

Returning to FIG. 3, in one arrangement, the length of the edge portions 104, 106 are configured such that, in use, as the bearing element 62 translates (arrow 45 in FIG. 2) within the housing 26 over a stroke length of about three inches, the bearing element 62 causes the rotational member 64 to rotate about its longitudinal axis 65. Other dimensions are suitable for use as well.

Figure 8:
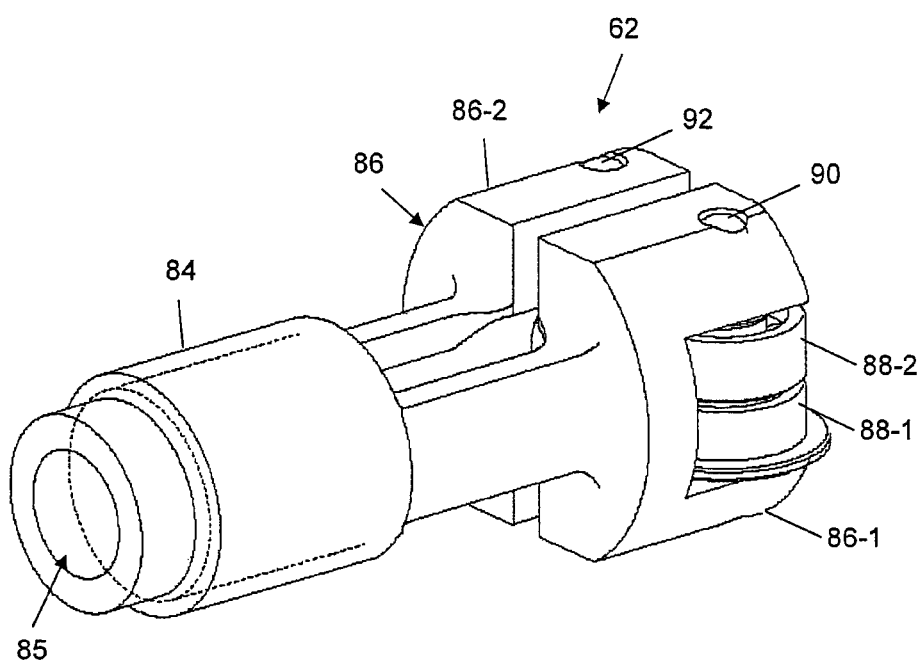
FIG. 8 illustrates a rear perspective view of the bearing element of FIG. 5.

In the aforementioned configuration, in order to reduce the overall size (i.e., length and height) of the actuator assembly 20, in one arrangement the longitudinal axis 65 of the rotational member 64 and the longitudinal axis 34 of the positioning element 30 and the housing 26 are substantially collinear. For example, the first portion 96 of the rotational element 64 extends through an opening 85 defined by the bearing element 62, as best illustrated in FIG. 8, and into the chamber 80 defined by the positioning element 30, as illustrated in FIG. 2. With a portion 84 of the rotational member 64 being carried by the bearing element 62 and extending into the positioning element's chamber 80, such an arrangement reduces the overall size of the actuator assembly 20.

As indicated above, in one arrangement, the rotational member 64 also includes a second portion 98 rotatably coupled to the housing 26. With reference to FIGS. 2, 3, and 4, the rotational member 64 carries the set of magnets 70 used as part of the sensor assembly 60. For rotary sensors, such as the sensor assembly 60, the stability of the set of magnets 70 is important to the accurate operation of the rotary sensor since exposure of the rotary sensor to external vibrations can cause the rotary sensor to generate erroneous output signals. Accordingly, in one arrangement and with reference to FIGS. 1, 3, and 4, the rotational member 64 includes a bearing 110, such as a rotary bearing, disposed at the second end 102 of the rotational element 64. As shown in FIG. 1, the bearing 110 secures the second portion 98 (i.e., the second end portion 102) of the rotational member 64 to the housing 26. The bearing 110 is configured to constrain both longitudinal motion 45 of the rotational element 64 relative to the housing 26 and lateral and longitudinal movement of the set of magnets 70 to isolate the magnet portion from undesired vibrations. Additionally, the bearing 110 is configured to allow rotational movement of the rotational member 64 and the set of magnets 70 about the longitudinal axes 34, 65 for detection by the set of sensors 72 carried by the housing 26.

While the bearing 110 can have a variety of configurations, in one arrangement, the bearing 110 includes a first bearing element 110-1 and a second bearing element 110-2. The use of two bearing elements 110-1, 110-2 as part of the rotation assembly 61 aids in minimizing backlash between the rotational element 64 and the housing 26. Accordingly, by minimizing backlash in the rotation assembly 61, the bearing elements 110-1, 110-2 improve the accuracy of the position or output signals generated by the sensor assembly 60 during operation.

In the arrangement described above, during operation, the actuator assembly 20 operates both the external control element 24 and the position sensing apparatus 22. For example, in response receiving a command signal, the motor 32 rotates the ball nut 38 relative to the positioning element 30. Based upon the interaction between the threads 46 of the ball nut 38 and the threads 48 of the positioning element 30 and because the external control element 24 rotationally constrains the positioning element 30, such rotation causes the positioning element 30 to linearly translate 45 relative to the longitudinal axis 34 of the actuator assembly 20. Such translation drives both the external control element 24 and the position sensing apparatus 22. In particular, as the positioning element 30 translates 45 along the longitudinal axis 34 of the housing 26, the positioning element 30 causes the bearing element to translate relative to the longitudinal axes 34, 65 of the rotational member 64. Such linear translation causes the edge portions 104, 106 to ride relative to the flanges 95-1, 95-2 and rotate the rotational member 64 relative to the longitudinal axis 65 of the rotational member 64. The rotational member 64, in turn, rotates the set of magnets 70 of the sensor assembly 60 relative to the set of sensors 72.

Furthermore, because the distance d is less than the thickness of rotational member 64, when the rotational member 64 is disposed between the first and second roller bearings 88-1, 88-2 and the third and fourth bearings 88-3, 88-4, the rotational member 64 causes the first and bearing support portions 86-1, 86-2 to bend or spring open. With such bending, the first and bearing support portions 86-1, 86-2 operate as cantilevered beam springs that maintain a substantially constant force on the rotational member 64 to minimize or eliminate backlash between the bearing support 86 and the rotational member 64.

In conventional rotary sensor devices, the presence of hysteresis or backlash, such as can occur with the use of gears or other power transmission devices used to drive a portion of the rotary sensor devices, can degrade the accuracy of the rotary sensor output. In the present position sensing apparatus 22, interaction of the bearing assembly 62 and the helically-shaped rotational member 64 reduces the presence of backlash within the position sensing apparatus 22 while converting the linear motion of the positioning element 30 into a rotary motion of the set of magnets 70. Accordingly, the position sensing apparatus 22 provides relatively accurate position sensing of the external control element 24. Additionally, the rotary sensor device used with the position sensing apparatus 22 does not require signal conditioning and signal processing equipment as does a conventional LVDT. Accordingly, installation and operation of the position sensing apparatus 22 is relatively less expensive compared to conventional position sensors.

As indicated above, the interaction of the bearing assembly 62 and the helically-shaped rotational assembly 64 reduces the presence of backlash within the position sensing apparatus 22. In one arrangement, the uniformity of the helix-shape of the rotational member 64 is integral to the accuracy of the output signal generated by the sensor assembly 60. In one arrangement, the helix-shape of the rotational member 64 is considered uniform when, with reference to FIG. 3, an angle 115 formed between a surface 117 of the rotational member 64 and a plane 119 perpendicular to the longitudinal axis 65 is substantially constant along the length of the rotational member 64. Such consistency provides uniform correlation between linear displacement of the positioning element 30 along the longitudinal axis 34 and angular displacement of the set of magnets 70 relative to the set of sensors 72.

Full Rotation Sensing (Number of Full 360 Degree Rotations)

The full rotation sensing assembly 68, which identifies the number of full rotations of the rotational member 64 when the positioning element 30 moves from an initial position to a sensed position, includes a linear displacement member 200 and a set of sensors 202 (also see FIG. 9). During operation, the linear displacement member 200 translates along the longitudinal axis 34 (FIG. 2) as the rotational member 64 rotates. The set of sensors 202 sense the position of the linear displacement member 200 along the longitudinal axis 34 to determine the number of times the rotational member 64 has fully rotated 360 degrees while the positioning element 30 moved from the initial position to the sensed position.

Accordingly, the partial angular displacement of the rotational member 64 as measured by the partial rotation sensing assembly 66 (explained earlier) and the number of fully 360 degree rotations of the rotational member 64 as measured by the full rotation sensing assembly 68 equals the total angular displacement of the rotational member 64. Since each sensing assembly 66, 68 is capable of providing accurate current position information even after a power loss, the sensing subsystem 60 is able to provide an accurate current position of the positioning element 30 without storing any current count information in memory. That is, the apparatus 22 is able to provide reliable position information even after a power interruption.

Figure 13:
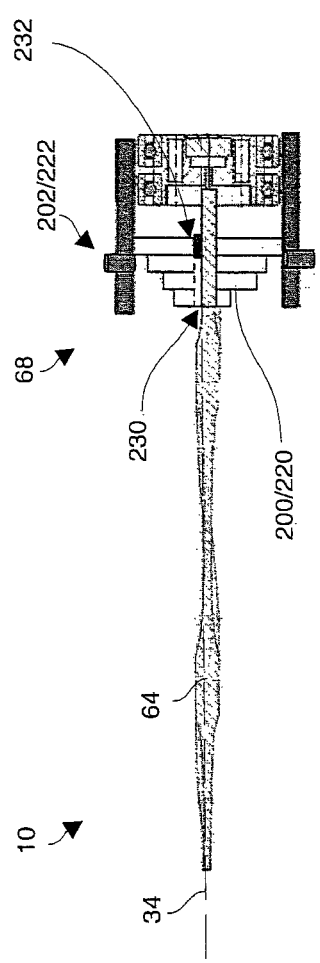
FIG. 13 illustrates certain details of a radially aligned position sensing arrangement in an initial state.
Figure 14:
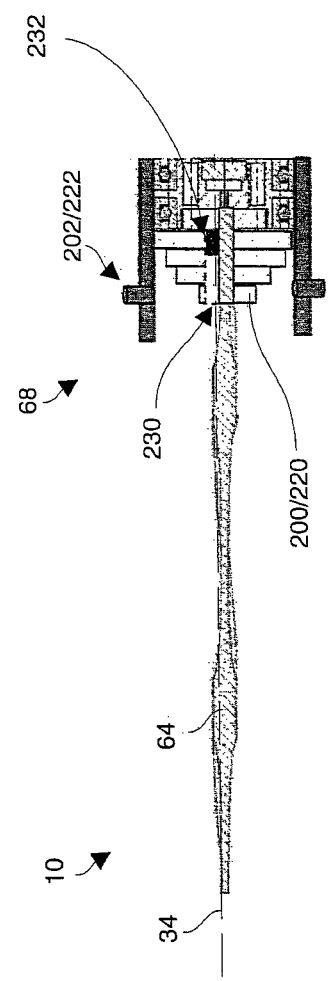
FIG. 14 illustrates certain details of the radially aligned position sensing arrangement in a different state.

It should be understood that there are various configurations for the linear displacement member 200 and the set of sensors 202 to enable effective sensing of the number of full 360 degree revolutions of the rotational member 64 when the positioning element 30 linearly translates from the initial position to the sensed position. For example, herein below is described an axial proximity embodiment in which the linear displacement member 200 has a constant radius and moves past a series of proximity sensors 202 which sense the same depth (FIGS. 11 and 12). As another example, further below is described a radial proximity embodiment in which the linear displacement member 200 has a stepped radius (i.e., a stepped surface which varies in depth) and proximity sensors 202 which sense different depths (FIGS. 13 and 14).

Axial Proximity Embodiment Details

FIGS. 11 and 12 show side views of a portion of the apparatus 10 at different times of operation in accordance with an axial proximity embodiment. FIG. 11 shows a side view of the portion of the apparatus 10 when the positioning element 30 (see FIG. 9) is at an initial position along the longitudinal axis 34 prior to rotating the rotational member 64. FIG. 12 shows a side view of the portion of the apparatus 10 when the positioning element 30 is at a current sensed position after rotating the rotational member 64.

As shown in FIGS. 11 and 12, the linear displacement member 200 takes the form of a nut 210 which defines a constant radius. Additionally, the set of sensors 202 takes the form of a series of proximity sensors 212 each of which is configured to sense at the same depth. By way of example only, the series of proximity sensors 212 includes four proximity sensors 212 and the nut 210 has a length which is spans all four proximity sensors 212.

In some arrangements, the nut 210 defines a fine pitch inner thread, and a non-helix-shaped portion (or extension) of the rotational member 64 defines a matching outer thread. In these arrangements, the nut 210 further defines a key, and the housing 26 (see FIG. 9) defines a slot enabling the nut 210 to translate linearly along the longitudinal axis 34 without any rotation. It should be understood that if the rotational member 64 turns in the reverse direction due to movement of the positioning element 30 back toward the initial position, the nut 210 translates linearly along the longitudinal axis 34 in the reverse direction.

In other arrangements, the nut defines a fine pitch outer thread, and a portion of the housing 26 defines a matching inner thread. In these arrangements, the nut 210 further defines a key slot, and the rotational member 63 (shown only in FIG. 2 for simplicity) defines a key enabling the nut 210 to translate linearly while rotating with the rotational member 64. It should be understood that if the rotational member 64 turns in the reverse direction due to movement of the positioning element 30 back toward the initial position, the nut 210 translates linearly along the longitudinal axis 34 as well as rotates in the reverse direction.

In these configurations, each full 360 degree rotation of the rotating member 64 causes the nut 210 to uncover exactly one proximity sensor 212. For example, one rotation exposes one proximity sensor 212, two rotations exposes two proximity sensors, and so on. Furthermore, each proximity sensor 212 outputs a bit of information, e.g., a signal having a de-asserted level if the nut 210 is immediately blocking that proximity sensor 212 and an asserted level if the nut 210 is not blocking that proximity sensor 212.

Accordingly, the outputs of the proximity sensors 212 form a bit pattern which identifies the number of full rotations performed by the rotational member 64. For example, at the initial position shown in FIG. 11, the bit pattern is "0000". However, at the sensed position shown in FIG. 12, the bit pattern is "1110". Here, number of asserted bits in the bit pattern (e.g., three) indicates the number of full 360 degree rotation of the rotating member 64.

It should be understood that a variety of alternatives are suitable for use as well. For example, the assertion levels and/or component geometries could be modified so that the number of de-asserted bits in the bit pattern indicates the number of full 360 degree rotation of the rotating member 64.

As another example, the assertion levels and/or component geometries can be configured so that a particular order of a highest order asserted bit of the bit pattern indicates a number of full revolutions performed by the rotational member 64. For example, with reference to FIGS. 11 and 12, suppose that the rightmost proximity sensor outputs the highest order bit, the next rightmost proximity sensor outputs the next highest order bit, and so on. In this example, there are no asserted bits in FIG. 11 thus indicating that the rotational member 64 has not made any full revolutions. However, in FIG. 12, the third highest order asserted bit of the bit pattern is set thus indicating that the rotational member 64 has fully rotated three times from the initial position.

As yet another example, suppose that the nut length of the nut 210 along the longitudinal axis 34 is modified so that it blocks only one proximity sensor at a time. In such an arrangement, the particular asserted (or de-asserted) bit of the bit pattern indicates how many full revolutions the rotational member 64 has made in response to linear translation of the positioning element 30 from the initial position to the sensed position. Other arrangements are suitable for use as well.

Radial Proximity Embodiment Details

FIGS. 13 and 14 show side views of a portion of the apparatus 10 at different times of operation in accordance with a radial proximity embodiment. FIG. 13 shows a side view of the portion of the apparatus 10 when the positioning element 30 (see FIG. 9) is at an initial position along the longitudinal axis 34 prior to rotating the rotational member 64. FIG. 14 shows a side view of the portion of the apparatus 10 when the positioning element 30 is at a current sensed position after rotating the rotational member 64.

As shown in FIGS. 13 and 14, the linear displacement member 200 takes the form of a nut 220 which defines a stepped radius, i.e., a stepped outer surface. Additionally, the set of sensors 202 takes the form of radially-aligned proximity sensors 222 each of which is configured to sense at a different depth. For example, the set of radially-aligned proximity sensors 222 can include four proximity sensors each sensing at a different depth and each positioned within a plane which is perpendicular to the longitudinal axis 34.

In some arrangements, the nut 220 defines a fine pitch outer thread, and a portion of the housing 26 defines a matching inner thread. In these arrangements, the nut 220 further defines a key slot 230, and the rotational member 64 defines a key 232 enabling the nut 220 to translate linearly while rotating with the rotational member 64. It should be understood that if the rotational member 64 turns in the reverse direction due to movement of the positioning element 30 back toward the initial position, the nut 220 translates linearly along the longitudinal axis 34 as well as rotates in the reverse direction.

In other arrangements (also see FIGS. 11 and 12), the nut 220 defines a fine pitch inner thread, and a non-helix-shaped portion of the rotational member 64 defines a matching outer thread. In these arrangements, the nut 220 further defines a key, and the housing 26 (shown only in FIG. 2 for simplicity) defines a slot enabling the nut 220 to translate linearly along the longitudinal axis 34 without any rotation. It should be understood that if the rotational member 64 turns in the reverse direction due to movement of the positioning element 30 back toward the initial position, the nut 220 translates linearly along the longitudinal axis 34 in the reverse direction.

In these configurations, each full 360 degree rotation of the rotating member 64 causes a particular step of the stepped outer surface of the nut 220 to align with the radially-aligned proximity sensors 202. For example, one rotation aligns a first step having a first radius with the sensors 202, two rotations exposes a second step having a second radius with the sensors 202, and so on. Furthermore, each proximity sensor outputs a bit of information, e.g., a signal having an asserted level if the depth of the aligned step of the nut 220 matches the sensing depth of that sensor 222, and a de-asserted level if the depth of the aligned step of the nut 220 does not match the sensing depth of that sensor 222.

As a result, the outputs of the proximity sensors 222 form a bit pattern which identifies the number of full rotations performed by the rotational member 64. For example, at the initial position shown in FIG. 11, the bit pattern of four sensors sensing at different depths can be "0010" indicating that the rotational member has rotated one full 360 degree revolution. Additionally, at the sensed position shown in FIG. 12, the bit pattern can be "1000" indicating that the rotational member has since rotated two more 360 degree revolutions for a total of three full 360 degree revolutions. Other arrangements are suitable for use as well.

Control Logic

FIG. 15 shows a position identification circuit 240 which is suitable for combining the outputs of the set of sensors 72 of the partial rotation sensing assembly 66 (also see FIGS. 2 and 4) and the set of sensors 202 of the full rotation sensing assembly 68 (also see FIGS. 11 through 14). In particular, the output 252 of the set of sensors 72 indicates the partial angular displacement of the rotation member inside 360 degrees. Additionally, the output 254 of bit pattern circuitry 256 which combines bit signals of the set of sensors 202 indicates the number of full 360 degree rotations of the rotational member 64.

As shown in FIG. 15, the position identification circuit 240 further includes summation circuitry 260 coupled to the sets of sensors 72, 202. The position identification circuitry further includes positioning circuitry 262 coupled to the summation circuitry 260.

During operation, the summation circuitry 260 receives the outputs 252, 254 from both assemblies 66, 68 and provides a summation signal 270. As mentioned earlier, the outputs provide accurate information without the need for any memory. Accordingly, the summation signal 270 is capable of providing a reliable indication of total rotation of the rotational member 64 in response to movement of the positioning element 30 from the initial position to the sensed position even following power interruption.

The positioning circuitry 262 receives the summation signal 270 from the summation circuitry 260 and outputs a signal 272 identifying the current position of the positioning element 30 relative to the housing 26. That is, the positioning circuitry 262 identifies the current actuator position for further processing or analysis, e.g., for use by the actuator controller 52 (FIG. 1).

It should be understood that control logic involved in determining the current position of the position element 30 relative to the housing 26 may reside in the housing 26 of the apparatus 10, or partly in the apparatus 10 and partly outside the housing 26 of the apparatus 10. For example, such control logic may be discrete from the actuator controller 52 (FIG. 1). Alternatively, some of the control logic may be formed by the actuator controller 52.

Since the position identification circuit 240 is able to withstand power interruption as well as track multiple revolutions of the rotational member 64, the apparatus 10 is well suited for a variety of application such as applications requiring high fault tolerance, long stroke applications, etc.

Further Details

Figure 16:
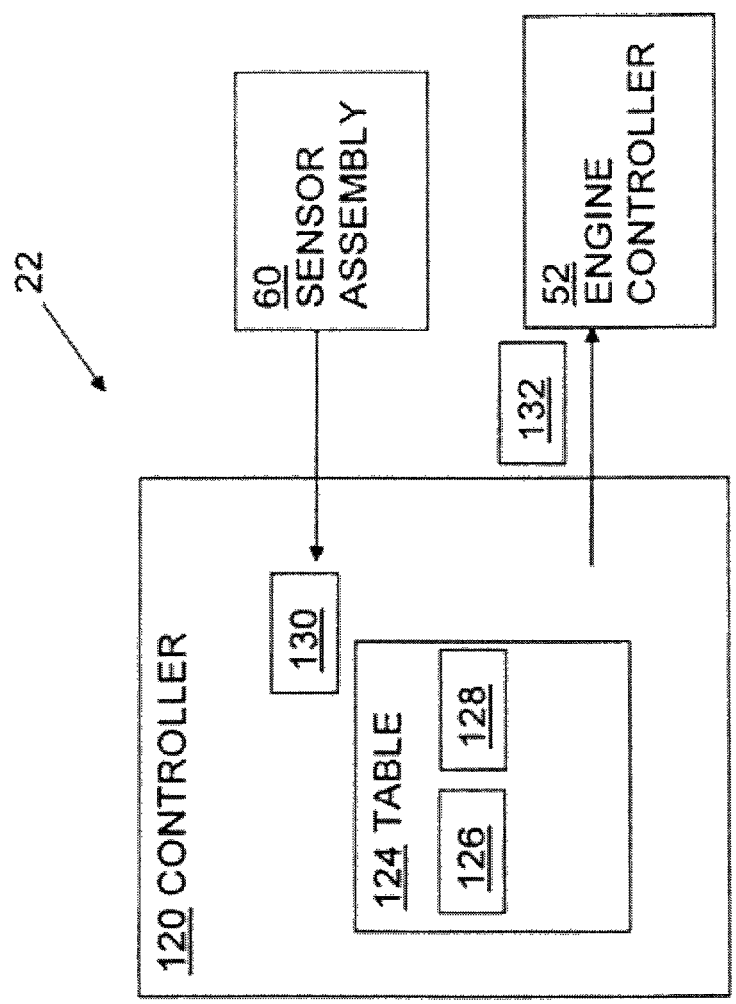
FIG. 16 illustrates certain details of the position identification circuit in accordance with a particular arrangement.

In one arrangement, as indicated in FIG. 16, the position sensing apparatus 22 includes a controller 120 of the positioning circuitry 262 configured to compensate or correct for inaccuracies in the summation signal 270, such as caused by a non-uniform helical geometry of the rotational member 64. For example, the controller 120, such as a processor, is configured with a position signal table 124 that relates a set of output signals 126 to a set of actual position data elements 128.

Prior to operation, a manufacturer empirically configures the position signal table 124 for a corresponding position sensing apparatus 22. For example, in order to characterize the position sensing apparatus 22, the manufacturer causes the rotational member 64 to translate by preset amounts, such as 0.010 inch increments, to rotate the set of magnets 70. At each increment, the manufacturer measures the corresponding output signal generated by the sensor assembly 60. The manufacturer then configures the position signal table 124 with the incremental position amounts as the set of actual position data elements 128 and the measured output signals as the corresponding set of output signals 126. In such an arrangement, each current position signal 272 provided by the sensor assembly 60 corresponds to an exact position of both the rotational member 64 and a corresponding external control element 24, for example, as recorded in the position signal table 124.

During operation of the position sensing apparatus 22, as the controller 120 receives the summation signal 270 from the summation circuitry 260, the controller 120 accesses the position signal table 124 to detect a correspondence between the received output signal 130 and entry in the set of output signals 126. After detecting such a correspondence, the controller 120 detects an actual position data element in the set of actual position data elements 128 that corresponds to the entry in the set of output signals 126. The controller 120 in turn, provides, as a reporting signal 132 to the actuator controller 52, the detected actual position data element where the detected actual position data element relates to the actual position of an actuated element, such as an external control element 24.

As described above, improved techniques are directed to position sensing and actuator techniques which involve use of a helix-shaped rotational member 64 and sensor assemblies 66, 68 which accurately detect rotation of the rotational member 64 beyond 360 degrees. Such techniques are well suited for applications requiring relatively large linear displacement (e.g., long stroke actuators). Moreover, such techniques still do not require memory to store current position information thus enabling accurate position sensing even after power interruption, and can alleviate the need to sacrifice actuator length for higher resolution.

While various embodiments of the present disclosure have been particularly shown and described, it will be understood by those skilled in the art that various changes in form and details may be made therein without departing from the spirit and scope of the present disclosure as defined by the appended claims.

For example, as indicated above, the set of magnets 70 of the partial rotation sensing assembly 60 is configured as a bipolar magnet having a north pole N and a south pole S. Such description is by way of example only. In one arrangement, the set of magnets 70 is configured as a permanent multi-pole magnet. Alternately, the set of magnets 70 is configured as multiple magnets, each of the multiple magnets configured as a bipolar magnet.

As indicated above, the position sensing apparatus 22 operates as part of the actuator assembly 20. Such indication is by way of example only. In one arrangement, the position sensing apparatus 22 is configured as a stand-alone device that is configured to attach to an actuated element, such as an external control element 24.

Additionally, it should be understood that the proximity sensors 212, 222 of FIGS. 11 through 14 were shown as detecting depth of the linear displacement member 200. The linear displacement member 200 was described above as being disposed around a non-helix-shaped portion of the rotational member 64. In other arrangements, the proximity sensors 212, 222 sense depth of the positioning element 30, or the depth of the linear displacement member 200 which attaches to the positioning element 30. Such modifications and enhancements are intended to belong to various embodiments of the disclosure.

What is claimed is:

1. A position sensing apparatus, comprising:
   a housing which defines a longitudinal axis;
   a positioning element which, relative to the housing, translates linearly along the longitudinal axis;
   a rotational member which, relative to the housing, rotates about the longitudinal axis as the positioning element translates linearly along the longitudinal axis, the rotational member defining a helix to receive torque from the positioning element as the positioning element translates linearly along the longitudinal axis;
   a first sensor assembly having (i) a set of magnets coupled to the rotational member and (ii) a first set of sensors coupled to the housing, the first set of sensors being constructed and arranged to detect angular displacement of the set of magnets about the longitudinal axis; and
   a second sensor assembly having (i) a linear displacement member, which relative to the housing, translates linearly along the longitudinal axis in response to movement of the positioning element and (ii) a second set of sensors coupled to the housing, the second set of sensors being constructed and arranged to detect linear displacement of the linear displacement member along the longitudinal axis.

2. A position sensing apparatus as in claim 1 wherein the rotational member is capable of rotating more than 360 degrees about the longitudinal axis in response to linear translation of the positioning element from an initial position along the longitudinal axis to a sensed position along the longitudinal axis, the initial position and the sensed position residing within a linear range of motion for the linear displacement member along the longitudinal axis;
   wherein the second set of sensors is constructed and arranged to provide a signal indicating a number of full 360 degree rotations of the rotational member in response to linear translation of the positioning element from the initial position to the sensed position;
   wherein the first set of sensors is constructed and arranged to provide a signal indicating a partial rotation of the rotational member which is less than 360 degrees in response to linear translation of the positioning element from the initial position to the sensed position; and
   wherein the number of full 360 degree rotations and the partial rotation of the rotational member which is less than 360 degrees identifies a full angular displacement of the rotational member in response to linear translation of the positioning element from the initial position to the sensed position.

3. A position sensing apparatus as in claim 2 wherein the linear displacement member defines an outer surface which, based on depth sensing, is detected by the second set of sensors to identify a current position of the linear displacement member along the longitudinal axis.

4. A position sensing apparatus as in claim 3 wherein the linear displacement member has a constant outer diameter; and
   wherein the second set of sensors includes multiple proximity sensing devices, each of the multiple proximity sensing devices being constructed and arranged to detect presence of the output surface of the linear displacement member at the same depth.

5. A position sensing apparatus as in claim 4 wherein the second set of sensors outputs a multi-bit signal in which a number of asserted bits of the multi-bit signal indicates a number of full revolutions performed by the rotational member in response linear translation of the positioning element from the initial position to the sensed position.

6. A position sensing apparatus as in claim 4 wherein the second set of sensors outputs a multi-bit signal in which a particular order of a highest order asserted bit of the multi-bit signal indicates a number of full revolutions performed by the rotational member in response linear translation of the positioning element from the initial position to the sensed position.

7. A position sensing apparatus as in claim 4 wherein the second set of sensors outputs a multi-bit signal in which a particular bit location of an asserted bit of the multi-bit signal indicates a number of full revolutions performed by the rotational member in response linear translation of the positioning element from the initial position to the sensed position.

8. A position sensing apparatus as in claim 3 wherein the linear displacement member has a stepped outer diameter; and
   wherein the second set of sensors includes multiple radially-aligned proximity sensing devices, each of the multiple proximity sensing devices being constructed and arranged to detect presence of the output surface of the linear displacement member at the different depth.

9. A position sensing apparatus as in claim 8 wherein the second set of sensors outputs a multi-bit signal in which a particular bit pattern of the multi-bit signal indicates a number of full revolutions performed by the rotational member in response linear translation of the positioning element from the initial position to the sensed position.

10. A position sensing apparatus as in claim 2 wherein the linear displacement member physically contacts the rotational member at a sliding interface to enable the linear displacement member to translate linearly relative to the rotational member.

11. A position sensing apparatus as in claim 2 wherein the linear displacement member is physically coupled to the positioning element to enable the linear displacement member to translate linearly with linear translation of the positioning element.

12. A position sensing apparatus as in claim 2, further comprising:
summation circuitry coupled to the first set of sensors and the second set of sensors, the summation circuitry including:
a first input which receives, as a first input signal, the signal indicating a partial rotation of the rotational member which is less than 360 degrees from the first set of sensors in response to linear translation of the positioning element from the initial position to the sensed position,
a second input which receives, as a second input signal, the signal indicating the number of full 360 degree rotations of the rotational member from the second set of sensors in response to linear translation of the positioning element from the initial position to the sensed position, and
a terminal which provides a summation signal based on the first input signal and the second input signal, the summation signal indicating the total angular displacement of the rotational member in response to linear translation of the positioning element from the initial position to the sensed position.

13. A position sensing apparatus as in claim 12, further comprising:
positioning circuitry coupled to the summation circuitry, the positioning circuitry including an input which receives the summation signal from the summation circuitry, and an output which provides a current position signal indicating a current position of the positioning element relative to the housing.

14. A position sensing apparatus as in claim 13 wherein the positioning element is constructed and arranged to connect to an external object; and wherein the position sensing apparatus further comprises:
an electric motor coupled to the housing, the electric motor being constructed and arranged to move the positioning element linearly along the longitudinal axis based on, as feedback, the current position signal to control positioning of the external object relative to the housing.

15. An actuator, comprising:
a base;
an electric motor coupled to the base; and
a position sensing assembly which includes:
a housing coupled to the base, the housing defining a longitudinal axis,
a positioning element which, relative to the housing, translates linearly along the longitudinal axis in response to operation of the electric motor to control positioning of an external object,
a rotational member which, relative to the housing, rotates about the longitudinal axis as the positioning element translates linearly along the longitudinal axis, the rotational member defining a helix to receive torque from the positioning element as the positioning element translates linearly along the longitudinal axis,
a first sensor assembly having (i) a set of magnets coupled to the rotational member and (ii) a first set of sensors coupled to the housing, the first set of sensors being constructed and arranged to detect angular displacement of the set of magnets about the longitudinal axis, and
a second sensor assembly having (i) a linear displacement member, which relative to the housing, translates linearly along the longitudinal axis in response to movement of the positioning element and (ii) a second set of sensors coupled to the housing, the second set of sensors being constructed and arranged to detect linear displacement of the linear displacement member along the longitudinal axis.

16. An actuator as in claim 15 wherein the rotational member is capable of rotating more than 360 degrees about the longitudinal axis in response to linear translation of the positioning element from an initial position along the longitudinal axis to a sensed position along the longitudinal axis, the initial position and the sensed position residing within a linear range of motion for the linear displacement member along the longitudinal axis;
wherein the second set of sensors of the second sensor assembly is constructed and arranged to provide a signal indicating a number of full 360 degree rotations of the rotational member in response to linear translation of the positioning element from the initial position to the sensed position;
wherein the first set of sensors of the first sensor assembly is constructed and arranged to provide a signal indicating a partial rotation of the rotational member which is less than 360 degrees in response to linear translation of the positioning element from the initial position to the sensed position; and
wherein the number of full 360 degree rotations and the partial rotation of the rotational member which is less than 360 degrees identifies a total angular displacement of the rotational member in response to linear translation of the positioning element from the initial position to the sensed position.

17. An actuator as in claim 16 wherein the linear displacement member of the second sensor assembly defines an outer surface which, based on depth sensing, is detected by the second set of sensors of the second sensor assembly to identify a current position of the linear displacement member along the longitudinal axis.

18. An actuator as in claim 17, further comprising:
summation circuitry coupled to the first set of sensors of the first sensor assembly and the second set of sensors of the second sensor assembly, the summation circuitry including:
a first input which receives, as a first input signal, the signal indicating a partial rotation of the rotational member which is less than 360 degrees from the first set of sensors in response to linear translation of the positioning element from the initial position to the sensed position,
a second input which receives, as a second input signal, the signal indicating the number of full 360 degree rotations of the rotational member from the second set of sensors in response to linear translation of the positioning element from the initial position to the sensed position, and
a terminal which provides a summation signal based on the first input signal and the second input signal, the summation signal indicating the total angular displacement of the rotational member in response to linear translation of the positioning element from the initial position to the sensed position; and positioning circuitry coupled to the summation circuitry, the positioning circuitry including an input which receives the summation signal from the summation circuitry, and an output which provides a current position signal indicating a current position of the positioning element relative to the housing, the current position signal controlling operation of the electric motor and positioning of the positioning element in a feedback manner.

\* \* \* \* \*